R. KRONENBERG.
DIVIDED WHEEL RIM SERVING AS TIRE RETAINER.
APPLICATION FILED APR. 7, 1908.
909,001. Patented Jan. 5, 1909.
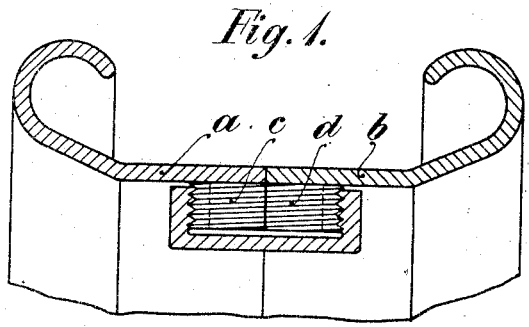
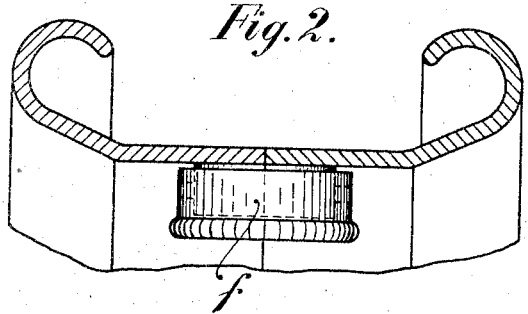
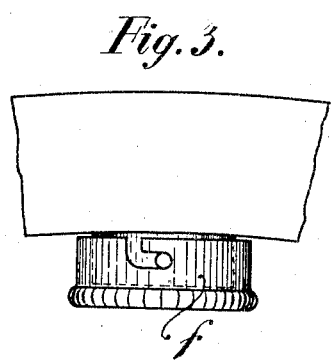
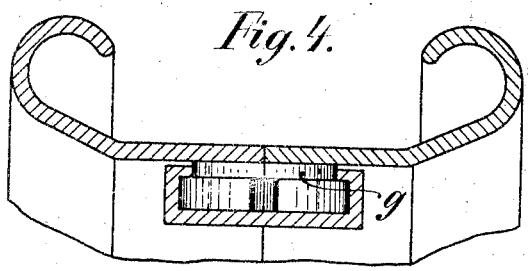
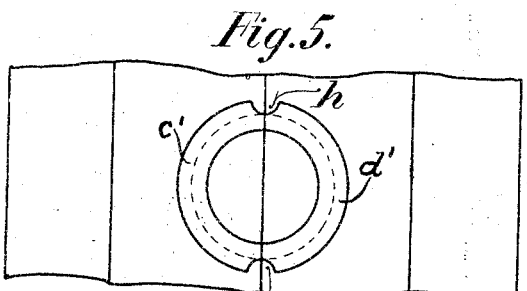
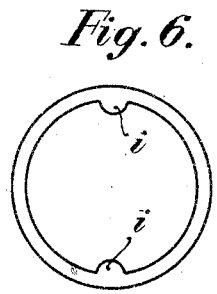
Witnesses:
G. Heinicke
F. Dittmar
Inventor
Rudolf Kronenberg
per G. Dittmar
Attorney

UNITED STATES PATENT OFFICE.

RUDOLF KRONENBERG, OF OHLIGS, GERMANY.

DIVIDED WHEEL-RIM SERVING AS TIRE-RETAINER.

No. 909,001.   Specification of Letters Patent.   Patented Jan. 5, 1909.

Application filed April 7, 1908. Serial No. 425,623.

*To all whom it may concern:*

Be it known that I, RUDOLF KRONENBERG, a subject of the German Emperor, residing at Ohligs, Germany, have invented certain new and useful Improvements in Divided Wheel-Rims Serving as Tire-Retainers, of which the following is a full, clear, and exact specification.

This invention relates to a device by which wheel rims for pneumatic tires divided in their symmetrical plane can be held together. Rims so divided are already known and have for their object to facilitate an easy removal and replacement of the pneumatic tire, especially of the outer cover.

The new device according to the present invention consists of a number of semi-cylindrical projections extending from the inner side of the divided rim radially in the direction towards the hub and having their plane face in the plane of division of the wheel rim. These projections are held together by elements such as a nut, a ring, or a cap. By these means a quick and easy removal and replacement of the halves of the rim is attained.

The drawing illustrates a number of modifications of the invention.

Figure 1 is a cross-section through the rim, the projections and clamping means provided with screw thread. Fig. 2 is a modification of the clamp in elevation having no screw thread, other means being used for securing the clamping element. Fig. 3 shows at right angles the means here employed. Fig. 4 is a cross-section illustrating another modification. Fig. 5 is the bottom view thereof, and Fig. 6 shows the special clamping cap used in this modified form.

According to Fig. 1 the rim is composed of two halves $a$ and $b$. Integral to each part of the rim is one half of a cylindrical projection, provided with screw thread on the periphery, thus the half-cylinder $c$ is firmly connected with the half rim $a$, and the other, $d$, with the half rim $b$. Upon these two halves $c$ and $d$, after they have been placed together, an open or closed cap $e$ is screwed, which assures a firm connection of the two half rims $a$ and $b$ when the wheel is in use.

Modifications of the invention are illustrated in the following figures 2—6. According to Figs. 2 and 3, a cap $f$, having a smooth inner surface, is pushed over the semi-cylindrical projections being also smooth, and having no screw thread, and held fast upon them by means of a bayonet slot joint. Figs. 4—6 show the projections to be provided with an annular recess or groove $g$ and with two opposite notches $h$ cut into the cylindrical surface, of even depth with the groove. Two corresponding projections $i$ of the cap are adapted to fit into the notches, so that the cap can be slipped over the lugs $c'$ and $d'$. Then, when the cap is turned, the parts $i$ engage the groove $g$ and thereby assure the connection.

Having thus described my invention what I claim is:

1. In a wheel rim divided in its symmetrical plane, for clamping the pneumatic tire, inner semi-cylindrical projections having their straight portion in the plane of division, annular bodies fitting over the cylindrical surface of said projections, and means to secure said annular bodies upon the projections, substantially as described.

2. In a wheel rim divided in its symmetrical plane, for clamping the pneumatic tire, inner semi-cylindrical projections having their straight portion in the plane of division, and having screw thread on the periphery and screw caps to fit said thread, substantially as described.

In testimony whereof I have signed my name to this specification in the presence of two subscribing witnesses.

RUDOLF KRONENBERG.

Witnesses:
LOUIS VANDORF,
BESSIE F. DUNLAP.